United States Patent
Peretz et al.

(10) Patent No.: US 11,726,597 B1
(45) Date of Patent: Aug. 15, 2023

(54) DIFFERENTIAL CAPACITIVE FORCE SENSING

(71) Applicant: Microsoft Technology Licensing, LLC, Redmond, WA (US)

(72) Inventors: Ahia Peretz, Elkana (IL); On Haran, Kfar Saba (IL); Federico Zannier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/827,115

(22) Filed: May 27, 2022

(51) Int. Cl.
*G06F 3/041* (2006.01)
*G06F 3/044* (2006.01)

(52) U.S. Cl.
CPC .......... *G06F 3/0414* (2013.01); *G06F 3/0443* (2019.05); *G06F 3/0447* (2019.05)

(58) Field of Classification Search
CPC ..... G06F 3/0414; G06F 3/0443; G06F 3/0447
See application file for complete search history.

(56) References Cited

U.S. PATENT DOCUMENTS

| | | | |
|---|---|---|---|
| 10,068,728 B2 | 9/2018 | Huska et al. | |
| 10,133,377 B2 | 11/2018 | Kim et al. | |
| 2009/0260897 A1 | 10/2009 | Kruse | |
| 2011/0011650 A1* | 1/2011 | Klinghult | H01H 13/803 178/18.03 |
| 2014/0307207 A1* | 10/2014 | Ge | G02F 1/13394 349/106 |
| 2015/0198844 A1* | 7/2015 | Choi | G02F 1/13394 359/891 |
| 2016/0378259 A1 | 12/2016 | Schediwy et al. | |
| 2017/0153737 A1 | 6/2017 | Chawda et al. | |
| 2017/0249049 A1 | 8/2017 | Wang et al. | |
| 2018/0188843 A1 | 7/2018 | Wang et al. | |
| 2018/0190722 A1 | 7/2018 | Lai et al. | |
| 2019/0212842 A1 | 7/2019 | Hinson et al. | |
| 2020/0064952 A1 | 2/2020 | Gupta et al. | |
| 2020/0278747 A1 | 9/2020 | Ligtenberg et al. | |
| 2022/0164102 A1 | 5/2022 | Rosenberg et al. | |
| 2022/0350429 A1 | 11/2022 | Ghioni et al. | |

FOREIGN PATENT DOCUMENTS

| | | |
|---|---|---|
| EP | 1840715 A2 | 10/2007 |
| KR | 101939280 B1 | 1/2019 |

OTHER PUBLICATIONS

"Capacitive Touch Hardware Design and Layout Guidelines for Synergy, RX200, and RX100", Retrieved from: https://www.renesas.com/in/en/document/apn/capacitive-touch-hardware-design-and-layout-guidelines-synergy-rx200-and-rx100-application-note?language=en, Jun. 14, 2017, 20 Pages.

(Continued)

*Primary Examiner* — Afroza Chowdhury
(74) *Attorney, Agent, or Firm* — Holzer Patel Drennan

(57) ABSTRACT

The described technology provides an apparatus for a computing device. The apparatus includes a touchpad configured to receive a force input, a printed circuit board (PCB) configured below the touchpad, the PCB being supported by a spring mechanism on a backet, and a plurality of sensing pads configured between the PCB and the backet such that an airgap exists between each of the plurality of sensing pads the backet, wherein each of the airgaps between the sensing pads and the backet has a height different than other airgaps.

18 Claims, 5 Drawing Sheets

(56) References Cited

OTHER PUBLICATIONS

"Design with Surface Sensors for Touch Sensing Applications on MCUs", Retrieved from: https://www.st.com/resource/en/application_note/dm00087990-design-with-surface-sensors-for-touch-sensing-applications-on-mcus-stmicroelectronics.pdf, Aug. 2021, 32 Pages.
Suen, et al., "Capacitive Tactile Sensor with Concentric-Shape Electrodes for Three-Axial Force Measurement", In Publication of MDPI, Dec. 19, 2018, 5 Pages.
"International Search Report and Written Opinion Issued in PCT Application No. PCT/US23/015986", dated Jun. 28, 2023, 12 Pages.

* cited by examiner

DIFFERENTIAL CAPACITIVE FORCE SENSING

BACKGROUND

Many computer devices take input from a keyboard. For example, a laptop computer has a display pivotably attached to a base comprising a keyboard. In addition to a keyboard, a computer device may also be attached to a mouse, or have a trackball or a touchpad for receiving further input. A touchpad detects touch by a user and converts this to an input signal. For example, a user may be able to control a pointer shown on the display by moving their finger across a surface of the touchpad. Touch sensitive displays are also used by some computer devices, whereby a user is able to input instructions directly to the computer by touching the display.

SUMMARY

The described technology provides an apparatus for a computing device. The apparatus includes a touchpad configured to receive a force input, a printed circuit board (PCB) configured below the touchpad, the PCB being supported by a spring mechanism on a backet, and a plurality of sensing pads configured between the PCB and the backet such that an airgap exists between each of the plurality of sensing pads the backet, wherein each of the airgaps between the sensing pads and the backet has a height different than other airgaps.

The above presents a simplified summary of the innovation in order to provide a basic understanding of some implementations described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Other implementations are also described and recited herein.

BRIEF DESCRIPTIONS OF THE DRAWINGS

Examples are illustrated in referenced figures of the drawings. It is intended that the examples and figures disclosed herein are to be considered illustrative rather than restrictive.

DETAILED DESCRIPTIONS

Figure 1:
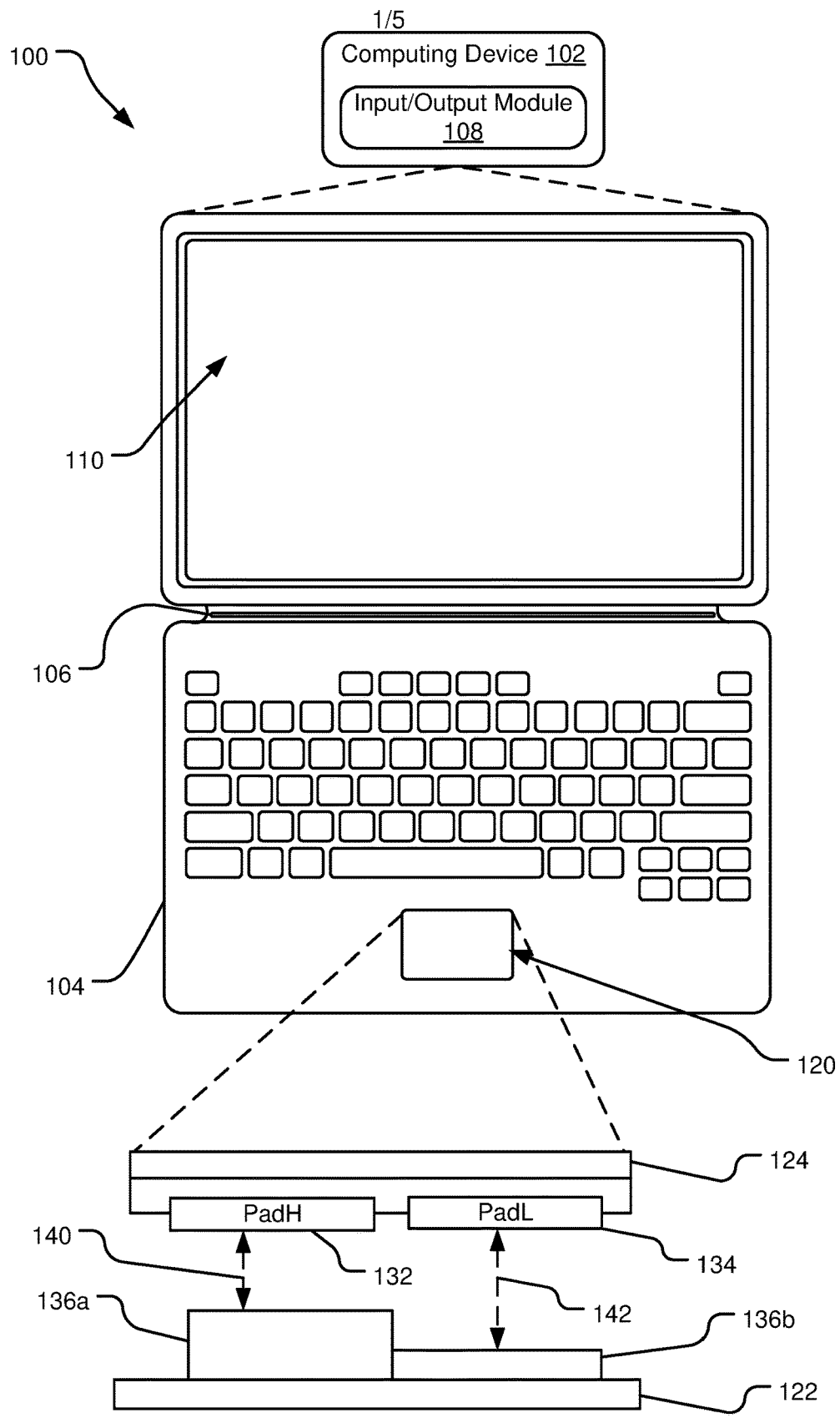
FIG. 1 illustrates an example computing system including a touchpad disclosed herein using differential capacitive force sensing.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Implementations of the claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

The described technology provides an apparatus for a computing device. The apparatus includes a touchpad configured to receive a force input, a printed circuit board (PCB) configured below the touchpad, the PCB being supported by a spring mechanism on a backet, and a plurality of sensing pads configured between the PCB and the backet such that an airgap exists between each of the plurality of sensing pads the backet, wherein each of the airgaps between the sensing pads and the PCB has a height different than other airgaps. Specifically, the implementations disclosed herein provide differential capacitive sensing that allows the touchpad to self-calibrate over the life of the device.

As consumer devices get thinner and thinner to satisfy industrial design and usability goals, mechanical user input devices such as moveable keys and dome switches are being displaced by super flat devices. Such super flat devices may employ different technologies, such as capacitive sensors, force-sensitive technologies such as FSR's (force-sensitive resistors), strain gauges, and piezoelectric or piezoresistive force sensors. These devices typically feature keys and buttons that provide little or no tactile feedback, either passive (e.g. texture or fixed relief) or active (responding to user activation). The result tends to be a compromised user experience: keys and buttons that provide little or no tactile feedback to the user, thereby reducing user confidence, efficiency, and quality of experience.

Capacitive force sensing technology may employ a printed circuit board (PCB) configured on a backet connected to electrical ground and one or more sensing pads configured between the PCB and the backet. The PCB may be configured on a spring system located between the backet and the PCB. In such implementation, the capacitance between the sensing pads below the PCB and the grounded backet is function of the height between the sensing pads and the backet. For example, if the area of a sensing pad is represented by Apad, the initial distance between the sensing pad and the grounded backet is d0, and the change in the distance as a result of force F by a user is d(F)=F/K, the capacitance as a result of the Force F can be given by the equation as provided below:

$$\text{Capacitance (Force)} = \varepsilon \frac{A_{pad}}{d_0 - d(F)} = \varepsilon \frac{A_{pad}}{d_0 - \frac{F}{K}}, K = \text{spring constant}, F = \text{force}$$

Here K is the spring constant of the spring system between the PCB and the grounded backet, F is the force applied by a user on the touch pad, and $\varepsilon$ is permittivity of the airgap (or the medium) between the spring pad and the grounded backet.

The sensitivity of such a touch pad system to force F may be given by the change in capacitance per give unit of force. If the capacitance is measured in femto farads (fF) and the force is measured in grams, the slope or the sensitivity may be given in fF/gram as follows:

$$\text{slope} = \frac{dC}{dF} = \varepsilon \frac{A_{pad}}{K\left(d_0 - \frac{F}{K}\right)^2},$$

Here, if $K^*d_0$ is significantly greater than F, then the slope is quite constant and the capacitance as function of the force is close to linear. The slope or the sensitivity may be increased by increasing $A_{pad}$, increasing E, decreasing $d_0$, or by decreasing K. The measured change in capacitance dC and the known value of the slope can be used to calculate the applied force dF. As shown above, the base height $d_0$ determines the slope or sensitivity of the touchpad. However, the base height $d_0$ changes over time as the touchpad is used due to wear on the springs between the backet and the PCB, temperature, etc. In other words, the base height $d_0$ that was determined at the time of the manufacturing cannot be used to determine the sensitivity and therefore the change in capacitance as function of the force applied on the PCB.

The implementation disclosed in FIG. 1 uses a touchpad system with differential capacitive sensing to self-calibrate the touchpad over life of a device even as the base height $d_0$ changes over time. Specifically, FIG. 1 illustrates a computing environment 100 that includes an example of a computing device 102 including a display 110 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, and so on that is configured to be held by one or more hands of a user. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device 104, pressure input from a touchpad 120 configured on the input device 104, and so forth.

In one implementation, the touchpad 120 includes a PCB 124 configured on top of a backet 122, wherein the PCB 124 may be supported by one or more springs on top of the backet 122. Furthermore, the touchpad 120 may include more than one pads 132, 134 formed on a lower surface of the PCB 124. In the illustrated implementation, the touchpad 120 also includes a stage 136 formed on the top of the backet 122 wherein the stage 136 has two different sections with a higher section 136a and a lower section 136b. The stage 136 may also be made of metal above a ground plane and connected to the ground plane of the backet 12. Specifically, the heights of the higher section 136a and the lower section 136b are different from each other such that a first spacing 140 between the padH 132 and the higher section 136a is 140 and a second spacing 142 between the padL 134 and the lower section 136b are also different from each other. Due to the difference in the spacings 140 and 142, the capacitance between the padH 132 and the stage 136 is also different from the capacitance between the padL 134 and the stage 136.

The differential capacitance between the two pads (or electrodes) 132, 134 and the stage 136 can be used to calibrate the $d_0$ of the touchpad 120 over the life of the touchpad 120 irrespective of the change in the $d_0$ from its factory settings. The determination of the $d_0$ of the touchpad 120 allows for more accurate calculation of force exerted by a user on the touchpad 120 in spite of wear and tear of one or more components of the touchpad 120, such as wear of the spring mechanism between the PCB 124 and the backet 122, etc. The detailed calculations used to calibrate the $d_0$ of the touchpad 120 based on at least one of the capacitance between the padH 132 and the stage section 136a, the capacitance between the padL 134 and the stage section 136b, and the difference in the heights 140 and 142 is disclosed in more detail with respect to an implementation of a touchpad 200 disclosed in FIG. 2.

Figure 2:
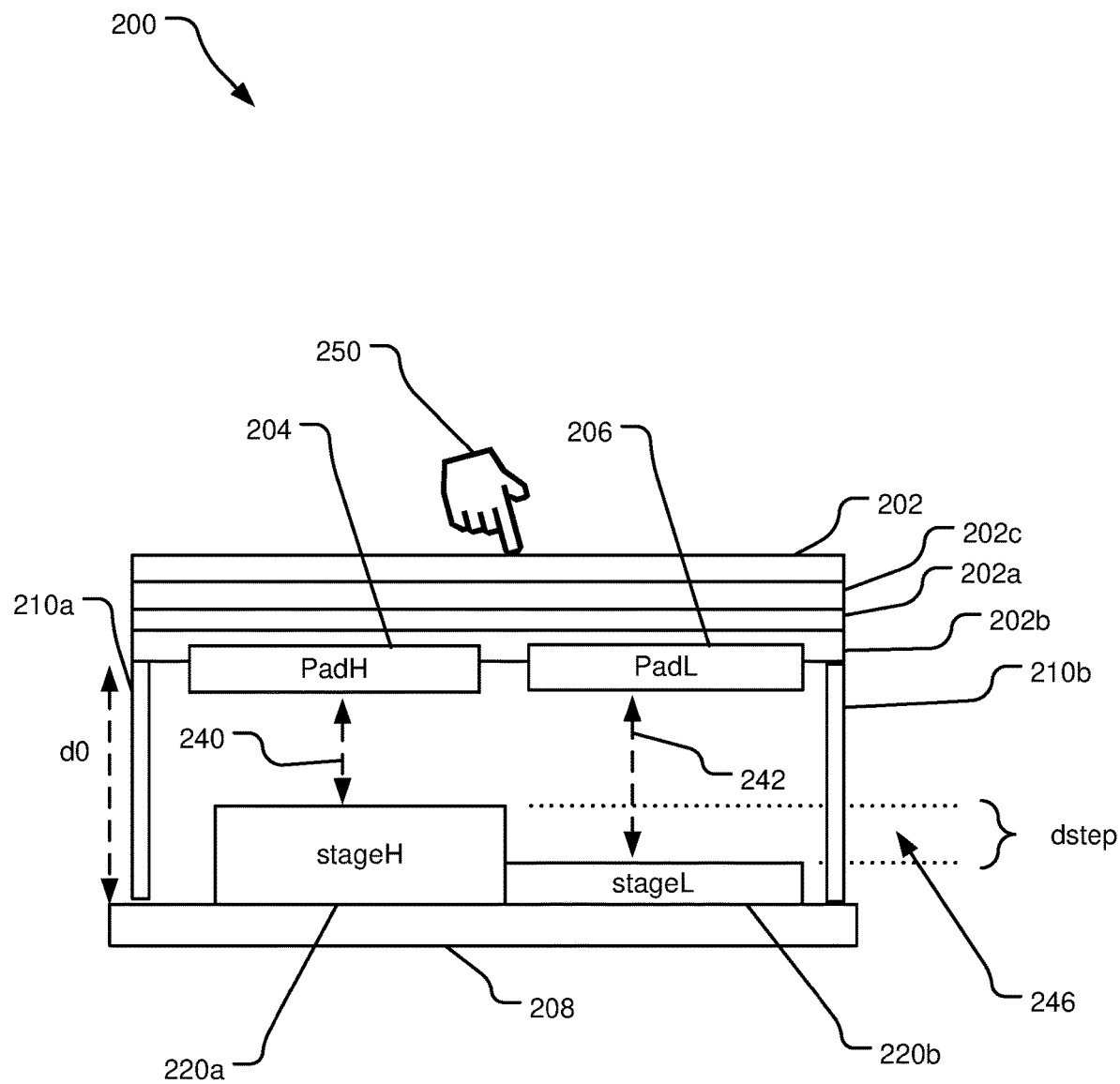
FIG. 2 illustrates an example touchpad disclosed herein using differential capacitive force sensing.

Specifically, FIG. 2 illustrates a detailed implementation of the touchpad 200 wherein the touchpad 200 provides differential capacitance between sections of a PCB 202 and a backet 208. Specifically, the PCB 202 include a number of layers including a ground plane 202a on the PCB 202, a metal layer 202b that is connected to various electrodes 204, 206, and an integrated circuit (IC) 202c that can measure the capacitance between the metal layer 202b and the backet 208. The electrodes 204 and 206 are also referred to as sensing pads 204, 206, specifically as sensing padH 204 and sensing padL 206. In the illustrated implementation, the PCB 202 is configured to be supported on the backet 208 by springs 210a and 210b.

The sensing pads 204, 206 are configured vertically above staging sections stageH 220 and stageL 220b that are formed on a ground plane of the backet 208. The staging sections stageH 220a and stageL 220b are formed such that the height of the stageH 220a above the ground plane of the backet 208 is higher than the height of the stageL 220b above the ground plane of the backet 108. In the illustrated implementation, the distance between the stageH 220a and padH 204 is 240 whereas the distance between the stageL 220b and padL 206 is 242, with the difference between the distances 240 and 242 being dstep 246. In one implementation, the $d_{step}$ 246 may be equal to some percentage of $d_0$. In other words, $d_0$ may be related to $d_{step}$ by a relationship given by $d_{step}=a^*d_0$, with a being a value between 0 and 1. For example, in one implementation, $d_{step}$ nay be substantially equal to 0.1 $d_0$.

The difference between the distances 240 and 242 being $d_{step}$ 246 is known by design. For example, in one implementation, the difference $d_{step}$ 246 may be substantially equal to 100 um. Alternatively, the difference $d_{step}$ 246 may be selected to be in the range of 50 um to 150 um. The distance $d_0$ between the metal layer 202b and the ground plane of the backet 208 may change due to warpage of the trackpad over temperature and lifetime. Furthermore, the adhesives and/or silicon used to connect the springs 210a, 210b can also change their dimensions due to temperature changes over the life of the trackpad 200. Similarly, the backet 208 can also have warpage due to mechanical stress, for example, when users use a computing device on an uneven surface such as, for example, in their laps. Over the life of the touchpad 200, even as the distance $d_0$ between the metal layer 202b and the ground plane of the backet 208 may change due to one of more reasons, the difference between the distances 240 and 242 being $d_{step}$ 246 remains constant. Another advantage of the disclosed implementation is that the use of two pads with different airgaps provides of two different estimated values of capacitance, which can be used to determine accurate determination of the force applied on the touchpad over a range of applied force values.

As illustrated below, the known value of the $d_{step}$ 246 together with measured values of change in capacitances at the sending pads 204 and 206 can be used to estimate the current value of distance $d_0$ between the metal layer 202b and the ground plane of the backet 208 and therefore a more accurate value of the pressure F exerted by a user on the touchpad 200. Thus, the illustrated implementation provides a technical benefit by allowing to more accurately determine the force exerted by a user on a touchpad over the life of the touchpad even as the current value of distance $d_0$ between the metal layer 202b and the ground plane of the backet 208 changes due to wear on the components of the touchpad 200, such as for example, wear on the spring components 210. Furthermore, as disclosed above, providing two pads with differential airgaps allows estimating two different values of capacitance between the pads and the backet, and these estimated values of capacitance can be used to accurately determine the current value of $d_0$ in spite of warpage of the backet 208 due to mechanical stress, thus allowing for more accurate determination of the force exerted by the user.

As a user 250 exerts pressure F on the top of the touchpad 200, the distances 240 and 242 also change, causing change in the capacitance sensed at the sensing padH 204 and at the sensing padL 206. Specifically, the capacitance sensed at padH 204 is $C_H(F)$ and the capacitance sensed at padL 206 is $C_L(F)$. Furthermore, the capacitances at the padH 204 and the padL 206 in absence of any force on the touchpad 200 are $C_H(0\,gr)$ i and $C_L(0\,gr)$. In this case, the change in the capacitance at padH 204 in response to force F may be given by the following equation, wherein the area of a sensing pad 200 is $A_{pad}$, the initial distance between the metal layer 202b and the backet 208 is $d_0$, K is the spring constant of the spring system 210a, 201b, and ε is permittivity of the airgap (or the medium) between the metal layer 202b and the grounded backet 208.

$$dC_H(F) =$$

$$C_H(0gr) - C_H(F) = C_{pcb} + \varepsilon\frac{A_{pad}}{d_0} - C_{pcb} - \varepsilon\frac{A_{pad}}{d_0 - \frac{F}{K}} = \varepsilon\frac{A_{pad}}{d_0} - \varepsilon\frac{A_{pad}}{d_0 - \frac{F}{K}}$$

Similarly:

$$dC_L(F) =$$

$$C_L(0gr) - C_L(F) = C_{pcb} + \varepsilon\frac{A_{pad}}{d_0} - C_{pcb} - \varepsilon\frac{A_{pad}}{d_0 - \frac{F}{K}} = \varepsilon\frac{A_{pad}}{d_0} - \varepsilon\frac{A_{pad}}{d_0 - \frac{F}{K}}$$

Therefore the force $F_H$ and the force $F_L$ at the sensing pads padH 204 and the sending padL 206 be determined from $dC_H(F)$ and $dC_L(F)$ as follows:

$$F_H = K\left(\frac{d_0^2}{\varepsilon\frac{A_{pad}}{dC_H(F)} + d_0}\right)$$

$$F_L = K\left(\frac{(d_0 + d_{step})^2}{\varepsilon\frac{A_{pad}}{dC_L(F)} + d_0 + d_{step}}\right)$$

Assuming small changes in the capacitances $dC_H(F)$ and $dC_L(F)$ at the sensing pads padH 204 and the sending padL 206, the force $F_H$ at the sensing pads padH 204 and $F_L$ the sending padL 206 can be estimated as follows:

$$F_{H\_linear\_estimation} = \frac{K}{\varepsilon A_{pad}}d_0^2 dC_H(F)$$

$$F_{L\_linear\_estimation} = \frac{K}{\varepsilon A_{pad}}(d_0 + d_{step})^2 dC_L(F)$$

The above linear estimations of force $F_H$ at the sensing pads padH 204 and $F_L$ the sending padL 206 are used to determine the distance $d_0$ between the metal layer 202b and the ground plane of the backet 208 using the equations disclosed below in table 1, which is subsequently used to get estimates of the force $F_H$ and the force $F_L$ at the sensing pads padH 204 and the sending padL 206.

TABLE I $$R = \frac{SlopeH}{SlopeL} = \frac{\Delta C_H}{\Delta C_L} = \frac{\varepsilon A_{pad}\left(\frac{1}{d_0} - \frac{1}{d_0 - \frac{F}{K}}\right)}{\varepsilon A_{pad}\left(\frac{1}{d_0 + d_{step}} - \frac{1}{d_0 + d_{step} - \frac{F}{K}}\right)} = \frac{(d_0 + d_{step})\left(d_0 + d_{step} - \frac{F}{k}\right)}{(d_0)\left(d_0 - \frac{F}{k}\right)}$$

Accurate solution for $d_0$ $$Rd_0^2 - R\frac{F}{K}d_0 - d_0^2 - 2d_{step}d_0 + \frac{F}{K}d_0 - d_{step}^2 + d_{step}\frac{F}{K} = 0$$

$$(R-1)d_0^2 + \left(\frac{F}{K}(1-R) - 2d_{step}\right)d_0 + d_{step}\left(\frac{F}{K} - d_{step}\right) = 0$$

$$d_0 = \frac{\frac{F}{K}(R-1) + 2d_{step} + \sqrt{\left(\frac{F}{K}(1-R) - 2d_{step}\right)^2 - 4(R-1)d_{step}\left(\frac{F}{K} - d_{step}\right)}}{2(R-1)}$$

TABLE I-continued

Estimated solution for $d_0$

For $d_0 \gg \dfrac{F}{K}$ $$R = \frac{(d_0 + d_{step})\left(d_0 + d_{step} - \dfrac{F}{k}\right)}{(d_0)\left(d_0 - \dfrac{F}{k}\right)} \cong \frac{(d_0 + d_{step})^2}{(d_0)^2}$$

$$(R-1)d_0^2 - 2d_{step}d_0 - d_{step}^2 = 0 \mid$$

$$d_{0-estimation} = \frac{d_{step}(1 + \sqrt{R})}{(R-1)}$$

To further improve the estimation, we can also estimate $F/k$ by assuming nominal $d_0$ So $d_{0-estimation2} = \dfrac{d_{step}(1 + \sqrt{R})}{(R-1)} + 0.5 \cdot \left(\dfrac{\text{linear estimated } F}{K}\right)$

---

One or more of the above estimations may be carried out by computer algorithm and instructions stored on a memory of a computing device as illustrated below in FIG. 6. For example, the touchpad 200 may sense the measured values of $dC_H(F)$ and $dC_L(F)$ at the sensing pads padH 204 and communicate the measured values to a processor of the computing device. The computing device may use the known values of $d_{step}$ and K to determine the estimated value of $d_0$. Subsequently, the computing device may use the estimated value of $d_0$ to determine the force $F_H$ and the force $F_L$ at the sensing pads padH 204 using the following:

$$F_H = K\left(\frac{d_0^2}{\varepsilon \dfrac{A_{pad}}{dC_H(F)} + d_0}\right)$$

$$F_L = K\left(\frac{(d_0 + d_{step})^2}{\varepsilon \dfrac{A_{pad}}{dC_L(F)} + d_0 + d_{step}}\right)$$

Figure 3:
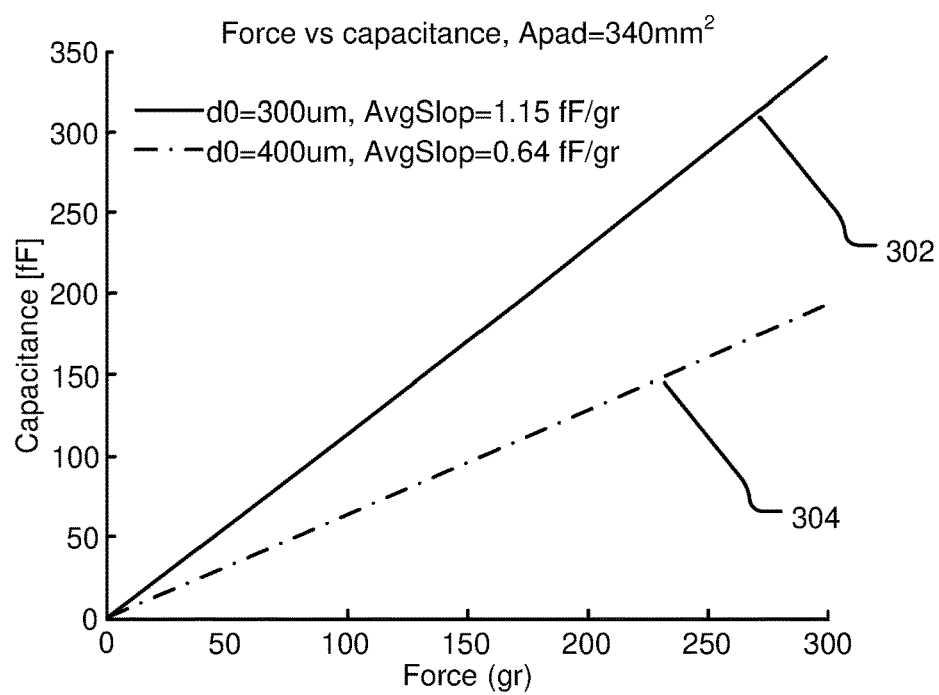
FIG. 3 illustrates an example graph of capacitance as a function of force for various values of distance d0 between a metal layer of touchpad PCB and a backet.
Figure 3:
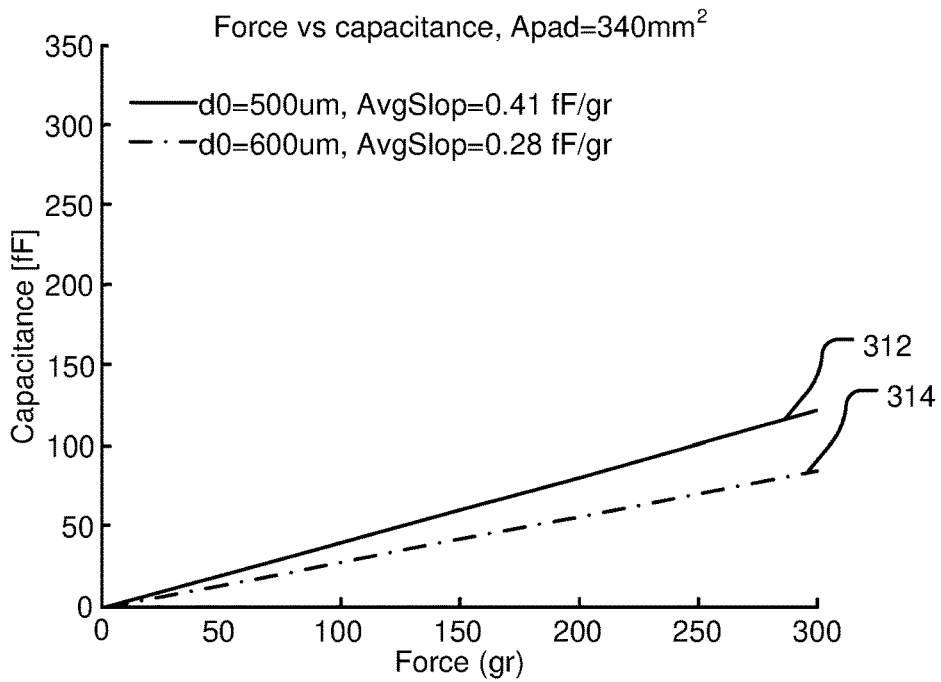

FIG. 3 illustrates graphs 300 of capacitance (femto-farads) as a function of force (grams) for various values of distance d0 between a metal layer of touchpad PCB and a backet given value of dstep being 100 um. Specifically, the graph 302 illustrates capacitance (femto-farads) as a function of force (grams) for d0 of 300 um between a metal layer of touchpad PCB and a backet. Similarly, each of the graphs 304, 312, and 314 illustrates capacitance (femto-farads) as a function of force (grams) for d0 of 400 um, 500 um, and 600 um, respectively between a metal layer of touchpad PCB and a backet. The slopes of the graphs 302-314 illustrate the values of slopeH and slopeH as used in the equations above to determine ratio R and the estimated value of d0.

Thus, if there is a differential distance provided between various sensing pads of a touchpad and the stage connected to a ground, as disclosed above in FIG. 2, the slope of the dC/dF graphs for each of the sensing pads is different. For example, referring to FIG. 2, if the distance 240 between the padH 204 and stageH 220a is 300 um, the dC/dF graph 302 with average slope of 1.15 fF/Gr is the sensitivity of the sensing padH 204. On the other hand, if the distance 242 between the padL 206 and the stageL 220b is 300 um, the dC/dF graph 302 with average slope of 0.64 fF/Gr is the sensitivity of the sensing padH 206. The differential sensitivity of the sensing padH 204 and the sensing padL 206 can be used to calibrate the current value of distance $d_0$ between the metal layer 202b and the ground plane of the backet 208 over the lifetime of the touchpad 200. The pressure F depends on $d_0^2$, the accurate calibration of $d_0$ allows for a more accurate determination of the value of the pressure F exerted by a user on the touchpad 200.

Figure 4:
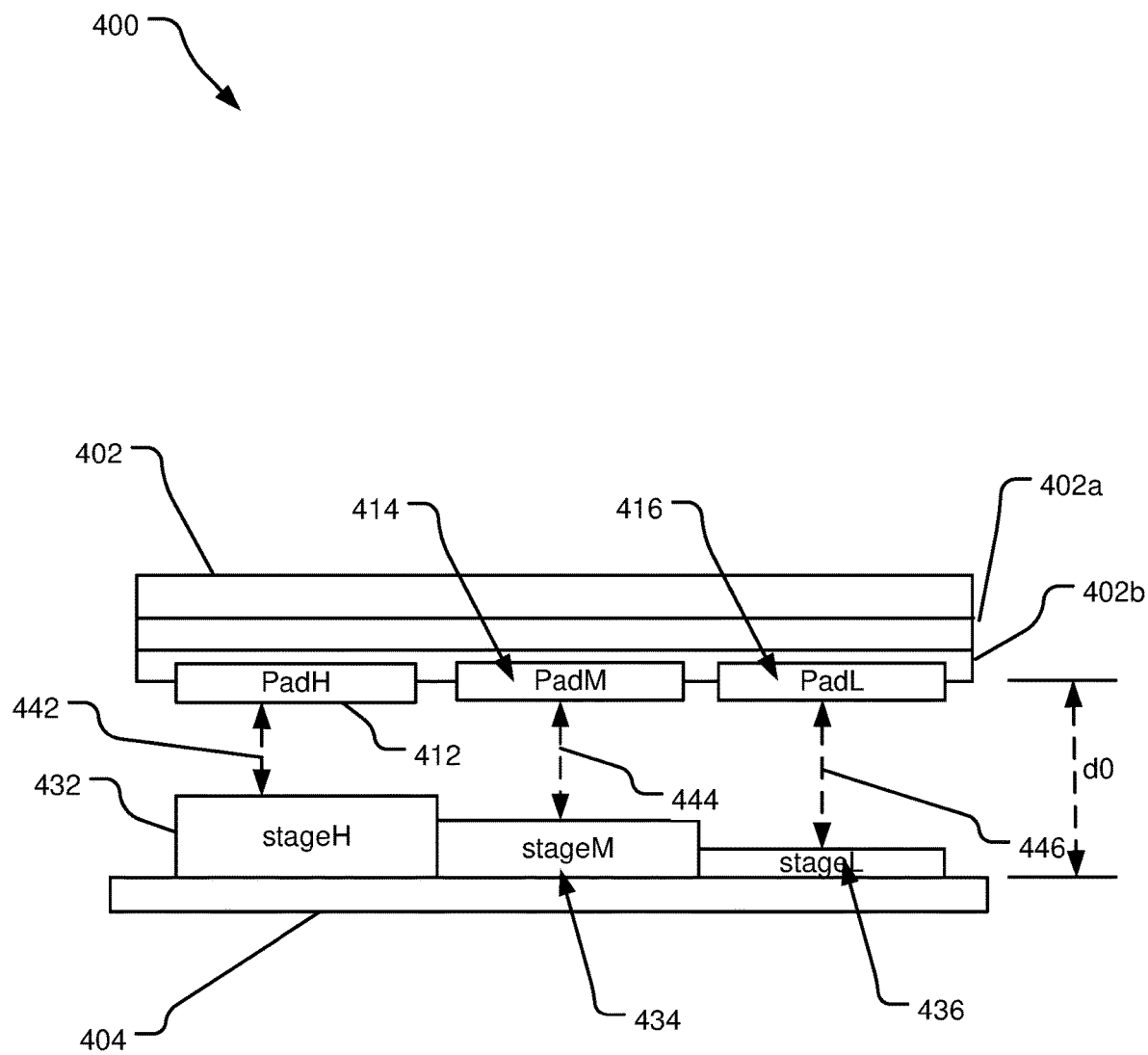
FIG. 4 illustrates an alternative example implementation of a touchpad disclosed herein using differential capacitive force sensing.

FIG. 4 illustrates an alternative implementation of a touchpad 500 disclosed herein using differential capacitive force sensing. Specifically, FIG. 4 illustrates a detailed implementation of the touchpad 400 wherein the touchpad 400 provides differential capacitance between sections of a PCB 402 and a backet 404. Specifically, the PCB 402 include a number of layers including a ground plane 402a on the PCB 202, and a metal layer 402b that is connected to various electrodes 204, 206, etc. The electrodes 204 and 206 are also referred to as sensing pads 412, 414, 416, specifically as a sensing padH 412, a sensing padM 414, and a sensing padL 416. The PCB 402 may be configured to be supported on the backet 404 by springs.

The sensing pads 412, 414, 416 are configured vertically above staging sections stageH 432, stageM 434, and stageL 436 that are formed on a ground plane of the backet 404. The staging sections stageH 432, stageM 434, and stageL 436 are formed such that the height of the stageH 432 above the ground plane of the backet 404 is higher than the height of the stageM 434 above the ground plane of the backet 404. Similarly, the height of the stageM 434 above the ground plane of the backet 404 is higher than the height of the stageL 436 above the ground plane of the backet 404. In the illustrated implementation, the distance between the stageH 432 and padH 412 is 442, the distance between the stageM 434 and padM 414 is 444, and the distance between the stageL 436 and padL 416 is 446, with the difference between the distances 444 and 442 being dstep1 and the difference between the distances 446 and 444 being dstep2.

The values of dstep1 and dstep2 may be known by design. Over the life of the touchpad 400, even as the distance d0 between the metal layer 402b and the ground plane of the backet 404 may change due to wear on the components of the touchpad 400, the values of dstep1 and dstep2 remains constant. The known value of the dstep1 and dstep2 together with measured values of change in capacitances at sensing pads 412, 414, and 416 can be used to estimate the current value of distance d0 between the metal layer 402*b* and the ground plane of the backet 404 and therefore a more accurate value of the pressure F exerted by a user on the touchpad 400. Thus, the illustrated implementation provides a technical benefit by allowing to more accurately determine the force exerted by a user on a touchpad over the life of the touchpad even as the current value of distance $d_0$ between the metal layer 402*b* and the ground plane of the backet 404 changes due to wear on the components of the touchpad 400. In one implementation each of dstep1 and dstep2 may be at least 50 um. Thus, the illustrated implementation allows to compensate for non-linearity in current value of distance $d_0$ in calculation of the pressure F exerted by a user on the touchpad 400. Specifically, using a third pad for capacitive sensing permits an additional different capacitance sensing. Therefore, using three pads, each having different airgap compared to the other from the stages on the backet allows for even more accurate determination of force compared to using two pads as disclosed above in FIG. 2.

Figure 5:
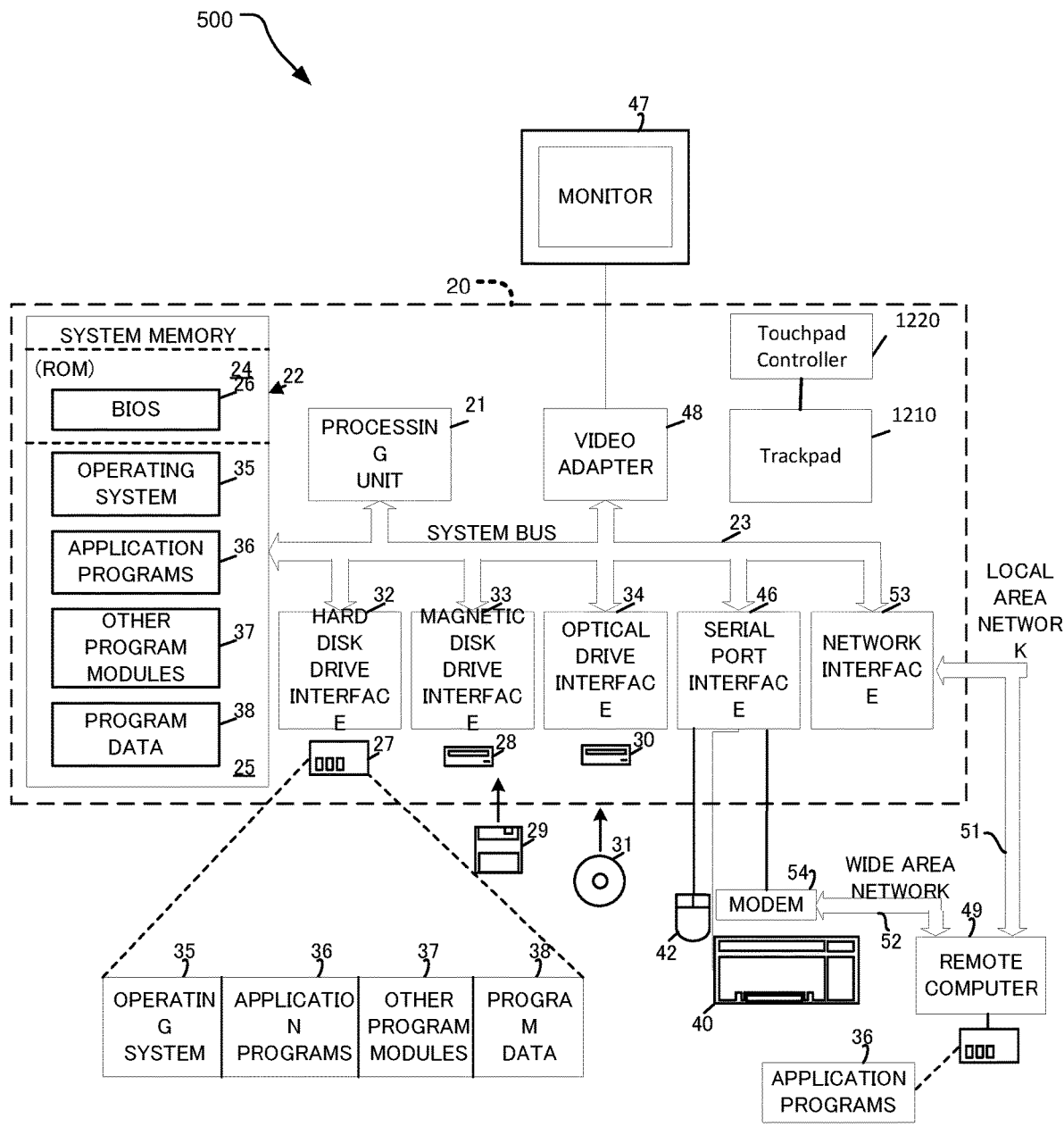
FIG. 5 illustrates an example computing system that may be used to implement the touchpad disclosed herein.

FIG. 5 illustrates an example system 500 that may be useful in implementing the touchpad disclosed herein. The example hardware and operating environment of FIG. 5 for implementing the described technology includes a computing device, such as a general purpose computing device in the form of a computer 20, a mobile telephone, a personal data assistant (PDA), a tablet, smart watch, gaming remote, or other type of computing device. In the implementation of FIG. 5, for example, the computer 20 includes a processing unit 21, a system memory 22, and a system bus 23 that operatively couples various system components including the system memory 22 to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 1200, the computer 20 also includes a touchpad 1210 such as a touchpad disclosed herein. The touchpad 1210 may communicate with touchpad controller 1220 to interpret the signal generated by the touchpad 1210.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM). A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a touchpad as disclosed herein. In one implementation, one or more instructions to interpret signal outputs generated by the touchpad 1210 may be stored in the memory of the computer 20, such as the read-only memory (ROM) 24 and random access memory (RAM) 25, etc.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 12 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software, or firmware instructions for the touchpad 1210 may be stored in system memory 22 and/or storage devices 29 or 31 and processed by the processing unit 21. The touchpad output and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared, and other wireless media.

Some implementations of the touchpad system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The differential capacitance sensing system disclosed herein may include a variety of tangible computer-readable storage media and intangible computer-readable communication signals. Tangible computer-readable storage can be embodied by any available media that can be accessed by the touchpad system disclosed herein and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the touchpad system disclosed herein.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared, and other wireless media.

An apparatus disclosed herein includes a touchpad configured to receive a force input, a printed circuit board (PCB) configured below the touchpad, the PCB being supported by a spring mechanism on a backet, and a plurality of sensing pads configured between the PCB and the backet such that an airgap exists between each of the plurality of sensing pads the backet, wherein each of the airgaps between the sensing pads and the backet has a height different than other airgaps.

A computing device disclosed herein includes memory, one or more processor units, and a touchpad apparatus, the touchpad apparatus including a touchpad configured to receive a force input, a printed circuit board (PCB) configured below the touchpad, the PCB being supported by a spring mechanism on a backet, and a plurality of sensing pads configured between the PCB and the backet such that an airgap exists between each of the plurality of sensing pads the backet, wherein each of the airgaps between the sensing pads and the backet has a height different than other airgaps and wherein the memory is configured to store one or more instructions executable by the one or more processor units, the one or more instructions comprising receiving values of capacitance from the plurality of sensing pads and determining a distance d0 between the PCB and the backet.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. An apparatus, the apparatus comprising:
a touchpad configured to receive a force input;
a printed circuit board (PCB) configured below the touchpad, the PCB being supported by a spring mechanism on a backet; and
a plurality of sensing pads configured between the PCB and the backet such that an airgap exists between each of the plurality of sensing pads and the backet,
wherein each of the airgaps between the sensing pads and the backet has a height different than other airgaps and wherein plurality of sensing pads comprises a first sensing pad ($pad_H$) connected to a first electrode of the PCB and a second sensing pad ($pad_L$) connected to a second electrode of the PCB.

2. The apparatus of claim 1, further comprising:
a first stage configured on the backet below the first sensing pad ($pad_H$), wherein the airgap between the first sensing pad ($pad_H$) and the first stage is $d_0$; and
a second stage configured on the backet below the second sensing pad ($pad_L$) wherein the airgap between the second sensing pad ($pad_L$) and the second stage is $d_0+d_{step}$, wherein $d_{step}$ being substantially equal to a percentage of $d_0$.

3. The apparatus of claim 2, wherein $d_{step}$ being at least 100 µ-meter.

4. The apparatus of claim 2, wherein the PCB is further comprising an integrated circuit configured to detect a change $\Delta C_H$ in capacitance at the first sensing pad ($pad_H$) in response to a force F and a change $\Delta C_L$ in capacitance at the second sensing pad ($pad_L$) in response to the force F.

5. The apparatus of claim 4, further comprising a touch pad controller configured to determine an estimated value of $d_0$ based at least in part on the detected values of $\Delta C_H$ and $\Delta C_L$ and a known value of $d_{step}$.

6. The apparatus of claim 5, wherein the touch pad controller further configured to determine the force F based at least in part on the estimated value of $d_0$.

7. The apparatus of claim 1, wherein the plurality of sensing pads comprising three sensing pads including a first sensing pad ($pad_H$) connected to a first electrode of the PCB, a second sensing pad ($pad_M$) connected to a second electrode of the PCB, and a third sensing pad ($pad_L$) connected to a second electrode of the PCB.

8. The apparatus of claim 7, further comprising:
a first stage configured on the backet below the first sensing pad (padH), wherein the airgap between the first sensing pad (padH) and the first stage is d0;
a second stage configured on the backet below the second sensing pad (padM) wherein the airgap between the second sensing pad (padM) and the second stage is d0+dstep1, wherein dstep1 being at least 50 µ-meter; and
a third stage configured on the backet below the third sensing pad (padL) wherein the airgap between the third sensing pad (padL) and the third stage is d0+dstep2, wherein dstep2 being at least 50 µ-meter.

9. The apparatus of claim 8, wherein the PCB is further configured to detect a change $\Delta C_H$ in capacitance at the first sensing pad ($pad_H$) in response to a force F, a change $\Delta C_M$ capacitance at the first sensing pad ($pad_M$) in response to a force F, and a change $\Delta C_L$ in capacitance at the first sensing pad ($pad_L$) in response to the force F; and
a touch pad controller configured to determine an estimated value of $d_0$ based at least in part on the detected values of $\Delta C_H$, $\Delta C_M$, and $\Delta C_L$ and known values of dstep1 and dstep2.

10. A computing device, comprising:
memory;
one or more processor units; and
a touchpad apparatus, comprising:
a touchpad configured to receive a force input;
a printed circuit board (PCB) configured below the touchpad, the PCB being supported by a spring mechanism on a backet, and
a plurality of sensing pads configured between the PCB and the backet such that an airgap exists between each of the plurality of sensing pads and the backet,
wherein each of the airgaps between the sensing pads and the backet has a height different than other airgaps;
wherein the memory is configured to store one or more instructions executable by the one or more processor units, the one or more instructions comprising receiving values of capacitance from the plurality of sensing pads and determining a distance d0 between the PCB and the backet;
wherein plurality of sensing pads comprises a first sensing pad ($pad_H$) connected to a first electrode of the PCB and a second sensing pad ($pad_L$) connected to a second electrode of the PCB.

11. The computing device of claim 10, further comprising:
a first stage configured on the backet below the first sensing pad ($pad_H$), wherein the airgap between the first sensing pad ($pad_H$) and the first stage is $d_0$; and
a second stage configured on the backet below the second sensing pad ($pad_L$) wherein the airgap between the second sensing pad ($pad_L$) and the second stage is $d_0+d_{step}$, wherein $d_{step}$ being substantially equal to a percentage of $d_0$.

12. The computing device of claim 11, wherein $d_{step}$ being at least 100 µ-meter.

13. The computing device of claim 11, wherein the PCB is further configured to detect a change $\Delta C_H$ in capacitance at the first sensing pad ($pad_H$) in response to a force F and a change $\Delta C_L$ in capacitance at the second first sensing pad ($pad_L$) in response to the force F.

14. The computing device of claim 13, further comprising a touch pad controller configured to determine an estimated value of $d_0$ based at least in part on the detected values of $\Delta C_H$ and $\Delta C_L$ and a known value of $d_{step}$.

15. The computing device of claim 14, wherein the touch pad controller further configured to determine the force F based at least in part on the estimated value of $d_0$.

16. The computing device of claim 10, wherein the plurality of sensing pads comprising three sensing pads including a first sensing pad ($pad_H$) connected to a first electrode of the PCB, a second sensing pad ($pad_M$) connected to a second electrode of the PCB, and a third sensing pad ($pad_L$) connected to a second electrode of the PCB.

17. The computing device of claim 16, further comprising:
a first stage configured on the backet below the first sensing pad (padH), wherein the airgap between the first sensing pad (padH) and the first stage is d0;
a second stage configured on the backet below the second sensing pad (padM) wherein the airgap between the second sensing pad (padM) and the second stage is d0+dstep1, wherein dstep1 being substantially equal to a percentage of d0; and
a third stage configured on the backet below the third sensing pad (padL) wherein the airgap between the third sensing pad (padL) and the third stage is d0+dstep2, wherein dstep2 being substantially equal to 0.1 $d_0$.

18. The computing device of claim 17, wherein the PCB is further configured to detect a change $\Delta C_H$ in capacitance at the first sensing pad ($pad_H$) in response to a force F, a change $\Delta C_M$ capacitance at the second sensing pad ($pad_M$) in response to a force F, and a change $\Delta C_L$ in capacitance at the third sensing pad ($pad_L$) in response to the force F; and
a touch pad controller configured to determine an estimated value of $d_0$ based at least in part on the detected values of $\Delta C_H$, $\Delta C_M$, and $\Delta C_L$ and known values of dstep1 and dstep2.

* * * * *